United States Patent
Weis

(10) Patent No.: US 10,496,802 B2
(45) Date of Patent: Dec. 3, 2019

(54) SECURITY AUDIT TRACKING ON ACCESS

(71) Applicant: NCR Corporation, Duluth, GA (US)

(72) Inventor: Daniel Weis, Fremont, CA (US)

(73) Assignee: NCR Corporation, Atlanta, GA (US)

( * ) Notice: Subject to any disclaimer, the term of this patent is extended or adjusted under 35 U.S.C. 154(b) by 280 days.

(21) Appl. No.: 15/404,719

(22) Filed: Jan. 12, 2017

(65) Prior Publication Data

US 2018/0198790 A1 Jul. 12, 2018

(51) Int. Cl.
| | |
|---|---|
| *H04L 29/06* | (2006.01) |
| *G06F 21/31* | (2013.01) |
| *H04W 12/06* | (2009.01) |
| *H04W 12/08* | (2009.01) |
| *H04W 12/00* | (2009.01) |

(52) U.S. Cl.
CPC ...... *G06F 21/31* (2013.01); *H04W 12/00503* (2019.01); *H04W 12/06* (2013.01); *H04W 12/0806* (2019.01); *G06F 2221/2111* (2013.01)

(58) Field of Classification Search
CPC ..................................................... H04L 63/20
USPC ............................................................ 726/4
See application file for complete search history.

(56) References Cited

U.S. PATENT DOCUMENTS

| | | | | |
|---|---|---|---|---|
| 7,308,581 | B1 * | 12/2007 | Geosimonian | G06F 21/32 713/182 |
| 8,090,945 | B2 * | 1/2012 | Singhal | G06F 21/32 713/168 |
| 9,703,478 | B2 * | 7/2017 | Yang | G06F 3/04842 |
| 2002/0031230 | A1 * | 3/2002 | Sweet | H04L 63/0428 380/278 |
| 2013/0078978 | A1 * | 3/2013 | Booth | H04W 8/20 455/418 |
| 2014/0380425 | A1 * | 12/2014 | Lockett | H04L 63/20 726/4 |

* cited by examiner

*Primary Examiner* — Longbit Chai
(74) *Attorney, Agent, or Firm* — Schwegman Lundberg & Woessner

(57) ABSTRACT

A login event is detected that is directed to a protected application. A geographical position of a device from which the login event originated is recorded in response to the login event. Also, a camera in communication with the device is activated and an image is take of an operator of the device in response to the login event. The login event, the geographical position, and the image are provided for security auditing to a security system associated with the protected application.

19 Claims, 4 Drawing Sheets

SECURITY AUDIT TRACKING ON ACCESS

BACKGROUND

On mobile applications (apps) consumers and organizations have a strong concern over the security of their devices, network resources, and credentials. A common fear is that family and friends of an employee can log into enterprise applications having access to enterprise confidential data and perform risky transactions either knowingly or unknowingly.

Sometimes employees may naïvely request that a spouse or family member having access to a computer or phone perform some enterprise operation on behalf of the employee that lacks access at a particular point in time. The employee may need to perform some transaction or obtain certain information. This seems innocuous and may not be grounds for employee dismissal but can create serious security risks for the enterprise of the employee. For instance, suppose the family member writes the login credentials down for the employee in advance of performing the needed transaction so that the credentials are not forgotten before the family member has a chance to login to the enterprise application and perform the transaction. Suppose further that friends of the family member are around at the time or even visitors that are performing some work at the home of the employee. The credentials could be stolen or memorized with relative ease by a nefarious visitor. At some later time, that nefarious visitor may try to access the enterprise for purposes of obtaining enterprise confidential information and/or performing unauthorized transactions.

In the above scenario, the unauthorized access to the enterprise application could potentially linger for an extended period of time before it is detected causing substantial harm to the enterprise and the employee (whose credentials were compromised).

Moreover, even if the credentials are changed by the employee or initially incorrectly memorized by the nefarious visitor, the failed access attempts by the nefarious visitor typically can go completely undetected and never raise any concern by the enterprise. But, if the individual that unsuccessfully tried to access enterprise assets occurred once, there is a good probability that the same individual will continue to try and gain access. It would be beneficial to have useful information regarding even failed access attempts; currently, failed access information is generally limited in the industry to device Internet Protocol (IP) address, calendar date associated with a failed access attempt, and time of day for the failed access attempt. Such information is practically of little use when an enterprise is proactively trying to prevent unauthorized access attempts before those attempts even occur.

SUMMARY

In various embodiments, methods and a device for security auditing on application access attempts are provided.

According to an embodiment, a method for security auditing on application-based access attempts is presented. Specifically, a login event is identified for a login attempt to access an application. A current location is obtained for a device that generated the login event. A camera is activated to capture an image of a user operating the device in response to the login event. Finally, the current location and the image are retained as audit information for the login.

DETAILED DESCRIPTION

Figure 1:
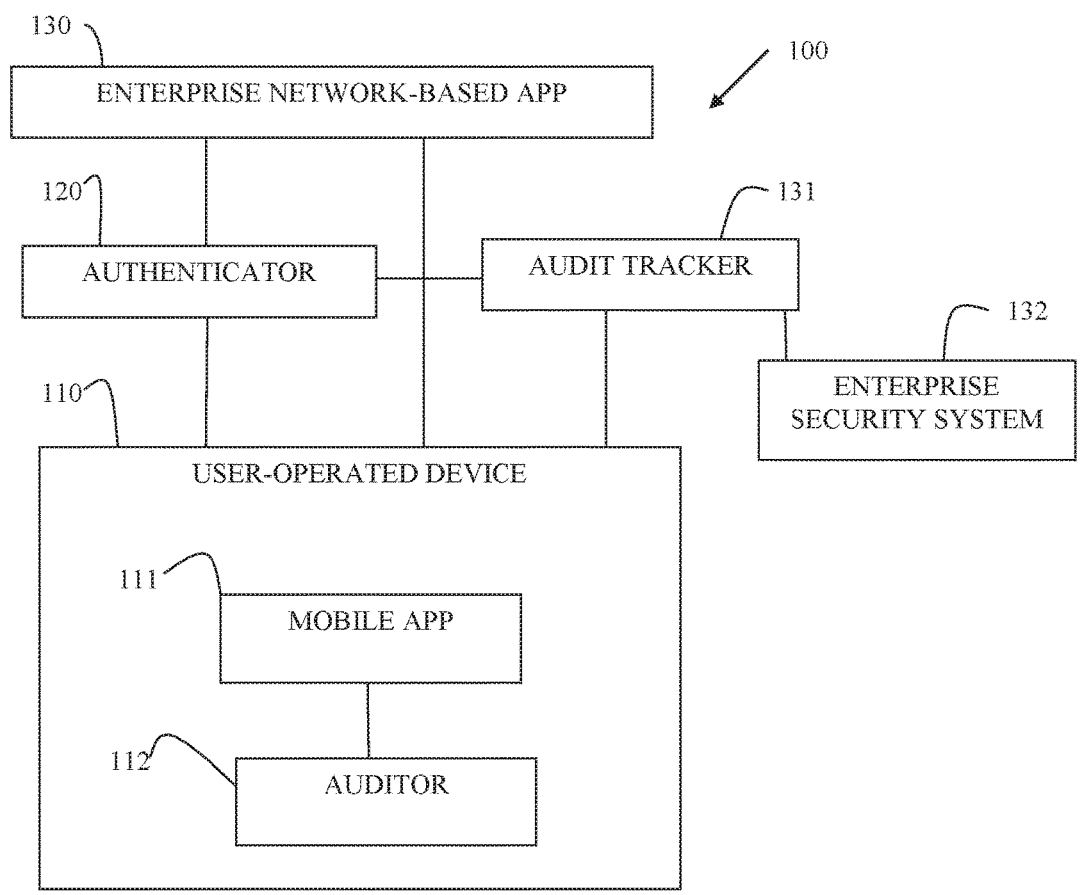
FIG. 1 is a diagram depicting a system for security auditing on application-based access attempts, according to an example embodiment.

FIG. 1 is a diagram depicting a system 100 for security auditing on application-based access attempts, according to an example embodiment. It is to be noted that the system 100 is shown with only those components relevant to understanding and comprehending the security auditing for application-based access attempts, presented herein and below.

The system 100 includes a user-operated device 110, an authenticator 120, and an enterprise network-based (protected and secured) application (app) 130.

The user-operated device 110 includes a mobile app 111 and an auditor 112.

The enterprise network-based app 130 includes an audit tracker 131 and an enterprise security system 132.

A user operates the device 110 for attempting to log into the enterprise app 130 by using the mobile app 111. The mobile app 121 is redirected to the authenticator 120 for the user to provide credentials for accessing the enterprise app 130. This raises a login event on the user device 110 and on the authenticator 120. In response to that event, the auditor 112 interacts with either the mobile app 111 and/or an Operating System (OS) of the device 110 to obtain a current physical location of the device 110 (such as through a Global Positioning Satellite (GPS) receiver, cellular data, WiFi data, or other available location-based information available to the device 110). Simultaneously and concurrently, the auditor 112 interacts with either the mobile app 111 and/or the OS of the device 110 to activate a camera associated with the device 110 for taking an image directed to an area where the user would be physically present when operating the device 110.

In an embodiment, the auditor then sends (through a network connection of the device 110), the current physical geographical location of the device 110 and the image to the audit tracker 131. Concurrently, the audit tracker 131 receives or obtains login information associated with the raised login event from the authenticator 120, such as an Internet Protocol (IP) address assigned to the device 110, the calendar day, the time of day, any user identifier supplied as part of the user's credentials for logging into the enterprise app 130, perhaps a Media Access Control (MAC) address for the device 110, an identifier for the authenticator 120, an identifier for the enterprise app 130, and other information available from the login event.

The audit tracker 131 creates an entry in an audit table indexed based on the user identifier and/or the enterprise app identifier. The entry includes the current geographical location of the device 110, the image of the user, the calendar date, the time of day, the user identifier, the enterprise app identifier, and the like.

In an embodiment, the audit tracker 131 dynamically pushes the new entry for the enterprise app 130 login attempt to the enterprise security system 132. The security system 132 performs facial recognition on a face of a user present in the user image captured by the camera associated with the device 110. When the facial recognition fails to match a known image of the user's face, the individual posing as the user is denied access to the enterprise app 130 if the authenticator 120 has not yet determined whether the credentials supplied permitted access to the enterprise app 120. In cases, where the individual posing as the user provided legitimate credentials and the authenticator 120 had already authorized the individual for access to the enterprise app 120, the security system 132 can immediately terminate the session between the device 110 and the enterprise app 130.

In an embodiment, the audit tracker 131 periodically sends the audit table to the security system 132. The security system 132 reviews logins by the user and compares the images with a known image for the user (using facial recognition). In all cases of past logins where the captured image for the user matches the known image for the user, the corresponding login entries are removed from the audit table. Should any past logins have images for the use that do not match a known image for the user, the security system 132 flags these logins and images and sends them to a security analyst for further review and action.

In an embodiment, the audit tracker 131 dynamically pushes the login entry to the security system 132. The security system 132 compares the current physical location of the device 110 against a geographical range for where the user is expected to be and when the current physical location falls outside the expected range, the security system 132 can instruct the authenticator to deny the existing login attempt, or in cases where the login was already successful, the security system 132 can terminate any existing session between the device 110 and the enterprise app 130. In some instances, the session (if one was validated) is permitted to proceed if the image taken for the login matches a known image for the user; optionally, in such a case, an information message can be sent to the user (through a text message, email, or as a popup during the session) indicating that the user is outside an expected geographical area and the session may be flagged for further security review as it proceeds.

Moreover, the audit table can be subsequently mined by the security system 132 for purposes of identifying new profiles that were present by the users when a known security breach occurred. For instance, a hacker may penetrate the enterprise app 130 when the user is accessing a hotel's WiFi and this can be discovered as a security risk by using the current physical locations of valid logins to the app 130 when the hack was discovered and identifying a current physical location as being a particular hotel in a particular geographical area. This can be used to block any subsequent logins by users when their current physical location during login is that particular hotel. Therefore, the geographical locations of users during logins can be processed to proactively establish new and previously unknown security risk behaviors or attributes.

Furthermore, the audit entries with the images and the current geographical locations of the device 110 during login attempts can be maintained even when a login attempt by the user to the enterprise app 120 fails and no authorized session is permitted. The images and current geographical locations of the device 110 can be stored in an encrypted and secure format on the device 110. It is noted that in some cases this capturing of the image of the user and the current physical location can be captured and maintained on the device 110 by the auditor 112, even when the failed login attempt was a situation where the device 110 lacked a useful network connection (was offline). Here, the auditor 112 can maintain a list of current physical locations as well as a date and time of when the locations were determined; replacing recently determined current locations with the oldest kept location (so reduce storage requirements). Alternatively, the device 110 may lack a usable network connection (cannot authenticated for use) but still the OS can resolve through that unusable network connection geographical location data, which the auditor can obtain. In still another case, the auditor 112 can utilize the GPS receiver of device 110 to obtain the current physical location of the device 110 even when the device 110 lacks any access to a data network. In any of these scenarios, once the device 110 reacquires a usable network connection, the auditor sends all failed login attempts (each attempt associated with an image of the user and the device's location) to the audit tracker 131. Therefore, previously undetectable failed logins (ones that could not even reach the authenticator 120 for attempting a network-based login attempt) can now be detected and used for security analysis with the teachings presented herein through the novel processing of the auditor 112 in connection with the mobile app 111 on the device 110.

So, the teachings permit capturing and processing an image associated with the user during a login attempt as well as processing a current geographical location for the device 110 that the user is operating during the login attempt. The login attempt can be successful (meaning the user provided valid credentials for accessing the enterprise app 130) or the login attempt can be unsuccessful (meaning the user provided invalid credentials for accessing the enterprise app 130). Further, the device may lack a usable data network connection during any of the failed and unsuccessful login attempts.

In an embodiment, the enterprise app 130 and the authenticator 120 may reside on the user-operated device 110 such that no data network connection is needed at all for accessing the enterprise app 130. This may be a situation where the enterprise app 130 is self-contained and access from device 110. The login event information, the user images, and the geographical locations can be periodically pushed to the audit tracker 131 or pulled from the audit tracker 131 when the device reacquires a valid data network connection.

In an embodiment, the enterprise app 130 is the OS for the device 110, such a picture (image) of the user and a current geographical location for the device 110 is noted by the auditor when the user attempts to access the device 110.

In an embodiment, the mobile app 111 is a web browser.

In an embodiment, the mobile app 111 is an app that permits access to the remote-based enterprise app 120.

In an embodiment, the device 110 is a mobile device, such as a phone, a laptop, a wearable processing device, and/or a tablet.

In an embodiment, the device 110 is a desktop computer.

In an embodiment, the device 110 is an intelligent appliance having a processor, memory, and/or storage.

In an embodiment, the device 110 is an integrated Central Processing Unit (CPU) into a vehicle (such as a car, a boat, airplane, motorcycle, etc.).

In an embodiment, the audit tracker 131 is an integrated module of the enterprise system 132.

In an embodiment, the authenticator 120 is a remote and external third-party authentication service that performs authentication on behalf of the enterprise app 130 and the security system 132.

In an embodiment, the security system 132 sends a message to the user when the current geographical location falls outside an expected range and/or when the image of the user does not match to a known image for the user. In an embodiment, the current geographical location and/or the captured image is provided to the user in the message. This may be particular useful to the user to identify the individual that accessed the device 110 and attempted to log into the enterprise app 120.

In an embodiment, the security system 132 filters out all login events having a known and expected image for the user and all geographical locations known to be associated with the user and the device 110 and retains just those images and geographical locations for logins and failed logins where the geographical locations fall outside and expected range and where the captured images do not match an expected image for the user.

In an embodiment, the auditor 112 or the OS of the device 110 provides a one-time popup window requesting permission of the user to access the camera and/or location services of the device 110. In other cases, an accepted license for the app 111 includes permission to access the camera and/or the location services of the device 110.

It is noted that the user of the phrase "enterprise app" 130 can be any consumer-based application where the user is a consumer and the application distributor is an organization. Alternatively, "enterprise app" 130 can be an application distributed by an enterprise that employs the user where the user is an employee of the application distributor.

The above-noted embodiments and other embodiments are now discussed with reference to the FIGS. 2-4.

Figure 2:
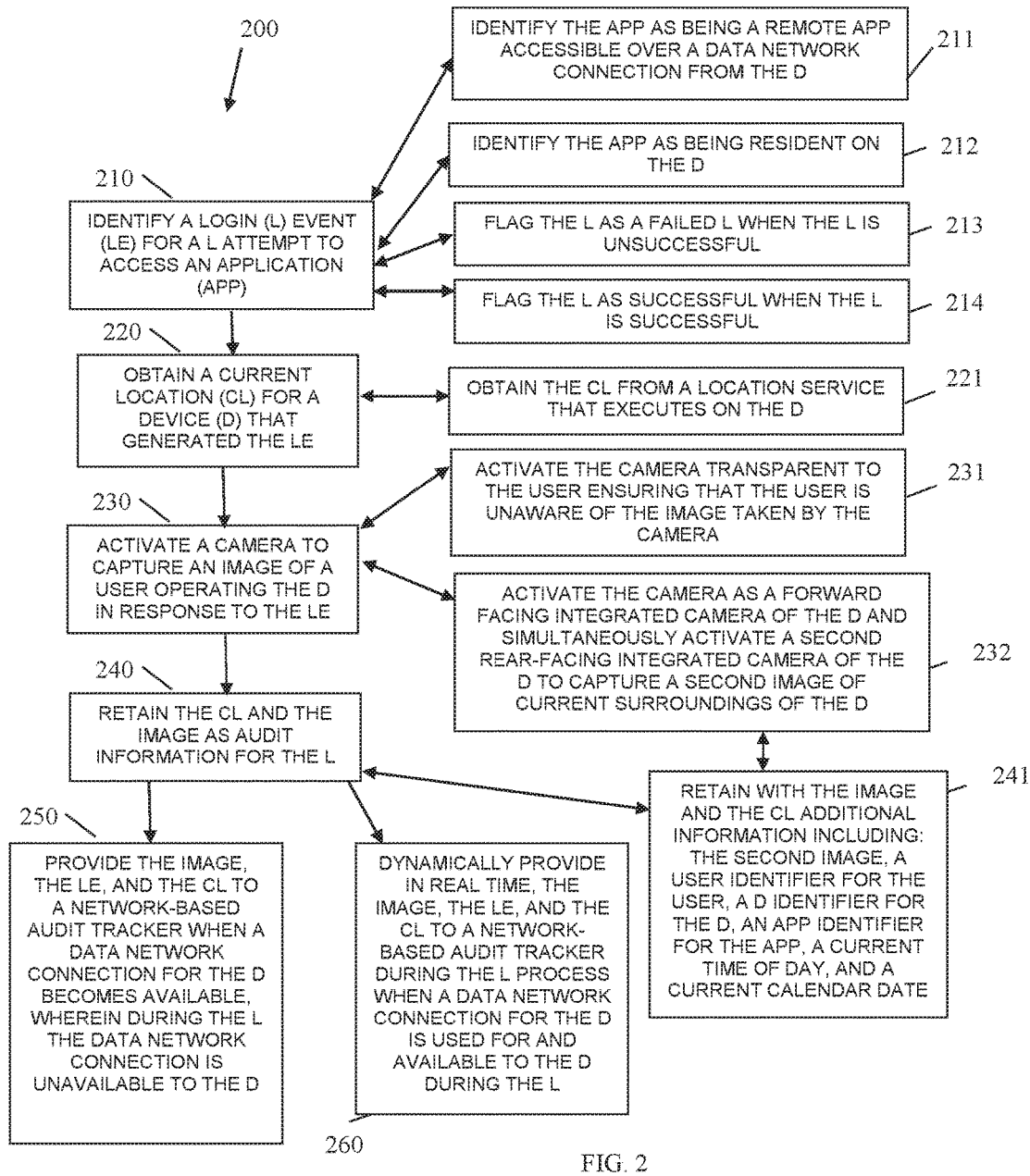
FIG. 2 is a diagram of a method for security auditing on application-based access attempts, according to an example embodiment.

FIG. 2 is a diagram of a method 200 for security auditing on application-based access attempts, according to an example embodiment. The method 200 when processed performs on-device security auditing during login attempts to an application accessible from the device. The method 200 is implemented as executed instructions representing one or more software modules referred to as an "auditor." The instructions reside in a non-transitory computer-readable storage medium and are executed by one or more processors of a computing-enabled device.

In an embodiment, the auditor is the auditor 112.

In an embodiment, the device that executes the auditor is the device 110.

In an embodiment, the device that executes the auditor is a Self-Service Terminal (SST). In an embodiment, the SST is an Automated Teller Machine (ATM). In an embodiment, the SST is a kiosk.

In an embodiment, the device that executes the auditor is a Point-Of-Sale (POS) terminal.

In an embodiment, the device that executes the auditor is a mobile device. In an embodiment, the mobile device is one of: a phone, a tablet, a wearable processing device, a laptop, an intelligent appliance, and a vehicle.

In an embodiment, the device that executes the auditor is a desktop computer.

In an embodiment, the device that executes the auditor is a server computer.

At 210, auditor identifies a login event for a login attempt to access an application. The login event can be generated by access made by a user operating the device and the user's attempt to launch an application, such as application 111. Alternatively, the login even can be generated by an authentication service, such as authenticator 120.

According to an embodiment, at 211, the auditor identifies the application that the user is attempting to access as a remote application accessible to the device over a data network connection from the device.

In another case, at 212, the auditor identifies the application that the user is attempting to access as being an application that is resident in memory of the device that the user is operating. This is a case where not data network connection is needed for accessing the application, but a login is still needed for access with credentials of some type, such as a Personal Identification Number (PIN), a password, a fingerprint, etc.

In an embodiment, at 213, the auditor flags the login as a failed login when the login is unsuccessful. This can occur for a variety of reasons, such as a lack of a data network connection when the application being accessed is remote and external to the device, when the user provides incorrect credentials, and other reasons.

In an embodiment, at 214, the auditor flags the login as being successful when the login is successful meaning the user provides a valid user identifier and credential(s) that is authenticated as being legitimate for access to the application.

At 220, the auditor obtains a current location for the device that executes the auditor. The device is where the user initiates the initial login and login event.

According to an embodiment, at 221, the auditor obtains the current location from a location service that executes on the device. The location service can be associated with an integrated GPS receiver on the device and or a network (WiFi or cellular) location determination service.

At 230, the auditor activates a camera to capture an image of a user operating the device in response to the login event.

In an embodiment, at 231, the auditor activates the camera in a manner that is transparent and obscured from the user and ensuring that the user is unaware of the image taken by the camera.

In an embodiment, at 232, the auditor activates the camera as a forward facing integrated camera of the device and simultaneously activates a second rear-facing integrated camera of the device to capture a second image of surroundings of the device.

At 240, the auditor retains the current location and the image as security login audit information for the login.

In an embodiment of 232 and 240, at 241, the auditor retains with the image and the current device location additional information that includes: 1) the second image, a user identifier for the user, 2) a device identifier for the device, 3) an application identifier for the application, 4) a current time of day, and 5) a current calendar date.

In an embodiment, at 250, the auditor provides the image, the login event, and the current location to a network-based audit tracker (such as audit tracker 131 and method 300 discussed below) when a data network connection for the device becomes available and when the data network connection is unavailable to the device during the login attempted by the user for access to the application from the device.

In an embodiment, at 260, the auditor dynamically provides, in real time, the image, the login event, and the current location of the device to a network-based audit tracker (such as audit tracker 131 and method 300 discussed below) during the login processing when a data network connection is used for and available to the device during the login.

Figure 3:
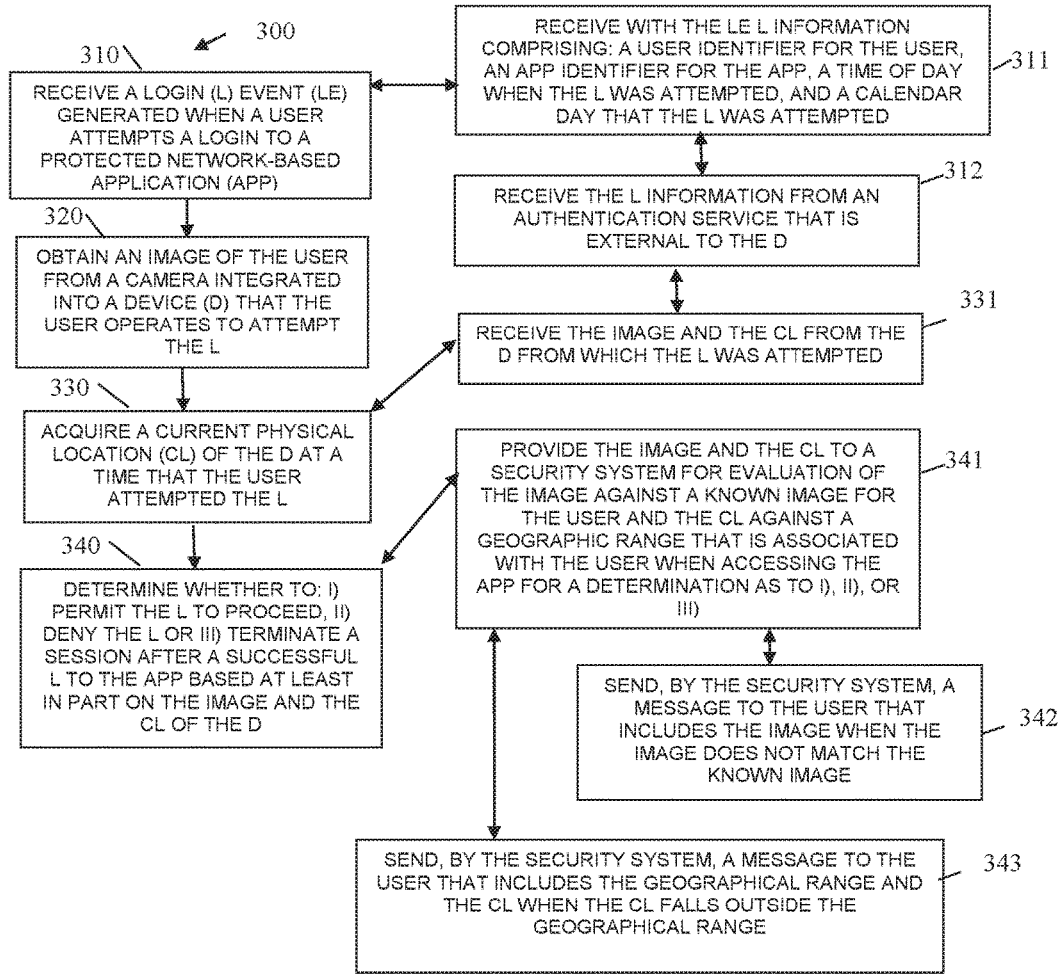
FIG. 3 is a diagram of another method for security auditing on application-based access attempts, according to an example embodiment.

FIG. 3 is a diagram of another method 300 for security auditing on application-based access attempts, according to an example embodiment. The method 200 when processed interacts with the auditor of the method 200 or the auditor 112. The method 200 is implemented as executed instructions representing one or more software modules referred to as an "audit tracker." The instructions reside in a non-transitory computer-readable medium and are executed by one or more processors of a hardware server.

In an embodiment, the audit tracker is executed by one or more processors a network-based server.

In an embodiment, the audit tracker is audit tracker 131.

In an embodiment, the audit tracker interacts with the auditor of the method 200 and/or the auditor 112 of the FIG. 1.

At 310, the audit tracker receives a login event generated when a user attempts a login to a protected network-based application (requiring an authenticated login with valid credentials for access).

According to an embodiment, at 311, the audit tracker receives with the login event login information comprising: 1) a user identifier for the user, 2) an application identifier for the protected network-based application, 3) a time of day when the login was attempted by the user, and 4) a calendar day that the login was attempted by the user.

In an embodiment, at 311 and at 312, the audit tracker receives the login information from an authentication service that is external to the device from where the login was initiated.

At 320, the audit tracker obtains an image of the user from a camera integrated into the device that the user operates to attempt the login.

At 330, the audit tracker acquires the current physical location of the device at the time that the user attempts the login.

In an embodiment of 312, 320 and 330, at 331, the audit tracker receives the image and the current physical location of the device from the device from which the login was attempted to access the protected network-based application.

At 340, the audit tracker determines whether to: 1) permit the login to proceed when authenticated for access, 2) deny the login even when authenticated for access and assuming access is already provided to the protected network-based application, or 3) terminate a session after a successful login to the protected network-based application. The determination is made based at least in part on the image and the current physical location of the device at the time of the login to the protected network-based application.

According to an embodiment, at 341, the audit tracker provides the image and the current physical location to a security system for evaluation of the image against a known image for the user and the current physical location against a predefined geographical range or listing of geographical ranges that is associated with the user when accessing the protected network-based application for a determination as to one of 1-3 (as discussed above at 340).

In an embodiment of 341 and at 342, the security system (associated with and interfaced to the audit tracker) sends a message to the user that includes the image of the user when the image does not match a known image for the user.

In an embodiment of 341 and at 343, the security system sends a message to the user that includes the geographical ranges or listing of geographical ranges and the current physical location when the current physical location of the device falls outside the geographical range or the listing of acceptable geographical ranges.

It is noted that the security system message to the user can include all of the image, the acceptable geographical ranges, and the current physical location of the device in a single message, such that 341 and 342 can be a single message.

Figure 4:
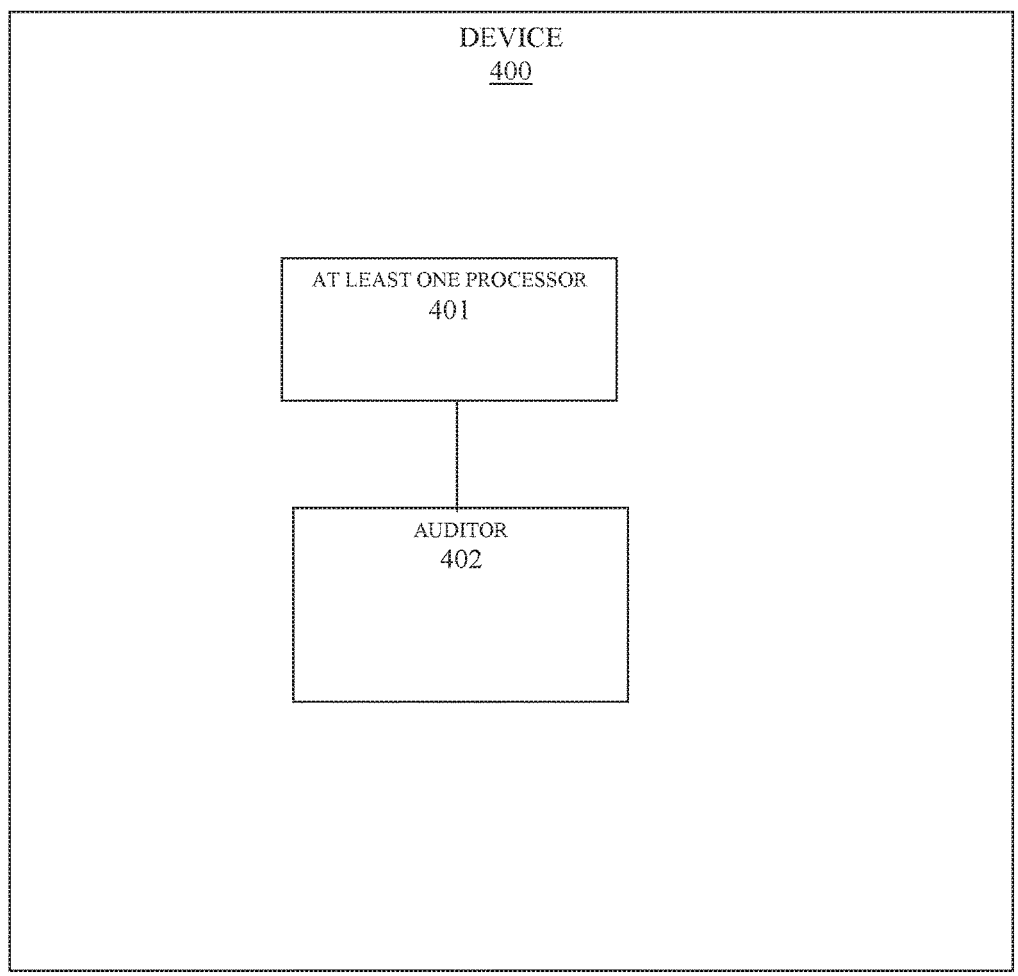
FIG. 4 is a device for security auditing on application-based access attempts, according to an example embodiment.

FIG. 4 is a device 400 for security auditing on application-based access attempts, according to an example embodiment. The device 400 includes a variety of hardware, and software/firmware components, some of which were discussed above with reference to the FIGS. 1-3.

In an embodiment, the device 400 is the device 110.

In an embodiment, the device 400 is a mobile device, such as a phone, a laptop, a tablet, a wearable processing device, an intelligent appliance, and/or an integrated CPU of a vehicle.

In an embodiment, the device 400 is a SST. In an embodiment, the SST is an ATM or a kiosk.

In an embodiment, the device 400 is a POS terminal.

In an embodiment, the device 400 is a desktop computer.

In an embodiment, the device 400 is a server.

In an embodiment, the device 400 performs any of the processing described above with respect to the FIGS. 1-3.

The device 400 includes a scanning controller with at least one processor 401 and an auditor 402.

In an embodiment, the auditor 402 is the auditor 112.

In an embodiment, the auditor 402 is the method 200.

The auditor 402 is configured to: execute on one or more processors of the device 400, record a current physical location for the device 400 on a login attempt, capture an image of a user operating the device 400 on the login attempt, and report the login attempt, the current physical location, and the image to an audit tracker that is external to and remote from the device 400.

In an embodiment, the audit tracker is the audit tracker 131.

In an embodiment, the audit tracker is the method 300 of the FIG. 3.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method for security audit tracking on access, comprising:

identifying a login event for a login attempt to access an application;

obtaining a current location for a device that generated the login event;

activating a camera to capture an image of a user operating the device in response to the login event by interacting with an Operating System (OS) of the device to activate the camera as front-facing integrated camera of the device to capture the image as a face of the user while the user operates the device as a mobile device of the user, wherein activating further includes activating the camera in a manner that is transparent to and obscured from the user to ensure that the user is unaware of the image captured by the camera which is directed to an area where the user would be physically present when operating the device; and retaining the current location and the image as audit information for the login, wherein retaining further includes creating an entry in an audit table for the login event, populating the entry with: an application identifier for the application obtained from the login event, a user identifier for the user obtained from the login event, a device identifier for the device, the current location, the image, a current time of day, and a current calendar day, and indexing the audit table base on: the user identifier for the user and other user identifiers supplied as part of user's credentials, the application identifier for the application and other application identifiers for other applications available for the login event.

2. The method of claim 1, wherein identifying further includes identifying the application as being a remote application accessible over a data network connection from the device.

3. The method of claim 1, wherein identifying further includes identifying the application as being resident on the device.

4. The method of claim 1, wherein identifying further includes flagging the login as a failed login when the login is unsuccessful.

5. The method of claim 1, wherein identifying further includes flagging the login as successful when the login is successful.

6. The method of claim 1, wherein obtaining further includes obtaining the current location from a location service that executes on the device.

7. The method of claim 1, wherein activating further includes activating the camera as a forward facing integrated camera of the device and simultaneously activating a second rear-facing integrated camera of the device to capture a second image of current surroundings of the device.

8. The method of claim 7, wherein retaining further includes updating the entry with the second image.

9. The method of claim 1 further comprising, providing the image, the login event, and the current location to a network-based audit tracker when a data network connection for the device becomes available, wherein during the login the data network connection is unavailable to the device.

10. The method of claim 1 further comprising, dynamically providing in real time, the image, the login event, and the current location to a network-based audit tracker during the login process when a data network connection for the device is used for and available to the device during the login.

11. A method for security audit tracking on access, comprising:

receiving a login event generated when a user attempts a login to a protected network-based application;

obtaining an image of the user from a camera integrated into a device that the user operates to attempt the login, wherein obtaining further includes interacting with an Operating System (OS) of the device to activate the camera as front-facing camera that captures a face of the user in the image while the user operates the device as a mobile device of the user, wherein obtaining further includes obtaining the image in a manner that is transparent to and obscured from the user to ensure that the user is unaware of the image captured by the camera which is directed to an area where the user would be physically present when operating the device;

acquiring a current physical location of the device at a time that the user attempted the login;

determining whether to: i) permit the login to proceed, ii) deny the login or iii) terminate a session after a successful login to the protected network-based application based at least in part on the image and the current physical location of the device;

indexing an entry into an audit table based on a user identifier for the user, other user identifiers supplied as part of user's credentials, an application identifier for the protected network-based application and other application identifiers for other applications available for the login event; and populating the entry with: the application identifier for the application obtained from the login event, the user identifier for the user obtained from the login event, a device identifier for the mobile device, the current physical location, the image, a current time of day, and a current calendar day.

12. The method of claim 11, wherein receiving further includes receiving with the login event login information comprising: a user identifier for the user, an application identifier for the protected network-based application, the current time of day when the login was attempted, and the current calendar day that the login was attempted.

13. The method of claim 12, wherein receiving further includes receiving the login information from an authentication service that is external to the device.

14. The method of claim 13, wherein obtaining and acquiring further includes receiving the image and the current physical location from the device from which the login was attempted.

15. The method of claim 11, wherein determining further includes providing the image and the current physical location to a security system for evaluation of the image against a known image for the user and the current physical location against a geographic range that is associated with the user when accessing the protected network-based application for a determination as to i), ii), or iii).

16. The method of claim 15 further comprising, sending, by the security system, a message to the user that includes the image when the image does not match the known image.

17. The method of claim 15 further comprising, sending, by the security system, a message to the user that includes the geographical range and the current physical location when the current physical location falls outside the geographical range.

18. A device configured for security audit tracking on access, comprising:

at least one hardware processor;

a non-transitory computer-readable storage medium having executable instructions; and the executable instructions when executed by the hardware processor cause the hardware processor to:

record a current physical location for the device on a login attempt;

capture an image of a user operating the device on the login attempt by interacting with an Operating System (OS) of the device to activate a camera of the device as a front-facing integrated camera to capture a face of the user in the image as the user operates the device as a mobile device of the user, and wherein the image is captured in a manner that is transparent to and obscured from the user to ensure that the user is unaware of the image captured by the camera which is directed to an area where the user would be physically present when operating the device; and report the login attempt, the current physical location, and the image to an audit tracker that is external to and remote from the device, and report a user identifier for the user obtained from the login attempt, an application identifier for an application obtained from the login attempt, a device identifier for the device, a current time of day, and a current calendar day, wherein the audit tracker is configured to create an entry in an audit table that includes information reported by the executable instructions, and wherein the entry is indexed into the audit table using the user identifier, other user identifiers supplied as part of user's credentials, the application identifier and other application identifiers for other applications available for the login event.

19. The device of claim 18, wherein the device is one of: a phone, a tablet, a laptop, and a wearable processing device.

* * * * *